(12) United States Patent
Watanabe et al.

(10) Patent No.: US 11,225,288 B2
(45) Date of Patent: Jan. 18, 2022

(54) FRONT VEHICLE BODY STRUCTURE OF VEHICLE

(71) Applicant: Mazda Motor Corporation, Hiroshima (JP)

(72) Inventors: Shigeaki Watanabe, Hiroshima (JP); Kuniyoshi Tashiro, Hiroshima (JP); Hiroki Matsuoka, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 68 days.

(21) Appl. No.: 16/568,685

(22) Filed: Sep. 12, 2019

(65) Prior Publication Data

US 2020/0086927 A1    Mar. 19, 2020

(30) Foreign Application Priority Data

Sep. 19, 2018 (JP) .............................. JP2018-174758

(51) Int. Cl.
*B62D 25/08* (2006.01)
*B60G 15/06* (2006.01)

(52) U.S. Cl.
CPC ......... *B62D 25/088* (2013.01); *B60G 15/067* (2013.01); *B62D 25/085* (2013.01); *B60G 2204/128* (2013.01); *B60G 2204/143* (2013.01)

(58) Field of Classification Search
CPC ............ B60G 2204/128; B60G 15/067; B62D 25/085; B62D 25/088
See application file for complete search history.

(56) References Cited

U.S. PATENT DOCUMENTS

| 7,370,869 | B2* | 5/2008 | Kang | B60G 15/07 |
| | | | | 280/124.147 |
| 2004/0140642 | A1* | 7/2004 | Perello | B60G 3/01 |
| | | | | 280/124.147 |
| 2014/0049072 | A1 | 2/2014 | Kim et al. | |
| 2014/0131969 | A1* | 5/2014 | Rowe | B60G 7/008 |
| | | | | 280/124.106 |
| 2017/0334488 | A1* | 11/2017 | Takata | B62D 27/04 |
| 2018/0029643 | A1* | 2/2018 | Maruyama | B62D 21/11 |

FOREIGN PATENT DOCUMENTS

| JP | S58179278 U | 11/1983 |
| JP | 2004268881 A | 9/2004 |
| JP | 2007126005 A | 5/2007 |
| JP | 2011005882 A | 1/2011 |

* cited by examiner

*Primary Examiner* — Paul N Dickson
*Assistant Examiner* — Maxwell L Meshaka
(74) *Attorney, Agent, or Firm* — Alleman Hall Creasman & Tuttle LLP

(57) ABSTRACT

A suspension having a first link member that is coupled to a front wheel and a second link member that is located on a rear side of the first link member is mounted to a suspension housing. The suspension housing has a first supporting part that supports the first link member and a second supporting part that is provided on a rear side of the first supporting part and supports the second link member. The front frame has a first fixing portion to which the first supporting part is fixed and a second fixing portion to which the second supporting part is fixed, and the first fixing portion and the second fixing portion are provided at positions different from each other in a vehicle width direction.

13 Claims, 13 Drawing Sheets

FRONT VEHICLE BODY STRUCTURE OF VEHICLE

BACKGROUND

The present invention relates to a front vehicle body structure of a vehicle having, at a front part thereof, a suspension housing to which components of a suspension are mounted.

DESCRIPTION OF THE RELATED ART

At a front part of a vehicle, such as an automobile, a suspension housing to which components of a suspension including a damper are mounted is provided. The suspension housing is fixed to a front frame extending in a vehicle front-rear direction (e.g., see Japanese Patent Laid-Open No. 2011-005882).

Suspension housings are commonly manufactured by a method of pressing a steel sheet. On the other hand, in view of the relatively low shaping flexibility of the pressing method, and aiming at a further weight reduction of vehicle bodies, some manufacturers are also considering a method of casting a suspension housing with aluminum (aluminum die casting).

The suspension housing is subjected to a load from the damper of the suspension, etc. Therefore, the suspension housing is required to have resistance to such a load so that the damper is maintained in an appropriate posture. In other words, the suspension housing is required to be rigid enough not to deform easily.

An object of the present invention is to provide a front vehicle body structure of a vehicle that can restrain deformation of a suspension housing.

SUMMARY

To achieve the above object, the present invention provides a front vehicle body structure of a vehicle including: a front frame provided at a front part of the vehicle and extending in a vehicle front-rear direction; a suspension that supports a front wheel; and a suspension housing which is fixed to the front frame and to which the suspension is mounted. The suspension has a first link member that is coupled to the front wheel and a second link member that is located on a rear side of the first link member. The suspension housing has a first supporting part that supports the first link member and a second supporting part that is provided on a rear side of the first supporting part and supports the second link member. The front frame has a first fixing portion to which the first supporting part is fixed and a second fixing portion to which the second supporting part is fixed, and the first fixing portion and the second fixing portion are provided at positions different from each other in a vehicle width direction.

In this configuration, the first supporting part and the second supporting part of the suspension housing that respectively support the first link member and the second link member of the suspension are fixed to the front frame. Thus, a load applied from the front wheel to the suspension housing through the link members can be appropriately transmitted and dispersed to the front frame, so that deformation of the suspension housing can be restrained. Moreover, in this configuration, the first supporting part and the second supporting part are respectively fixed to the first fixing portion and the second fixing portion of the front frame that are located at different positions in the vehicle width direction. Thus, deformation of the suspension housing around an axis in the vehicle front-rear direction can be effectively restrained.

In the above configuration, the first supporting part may have a first pivotally supporting portion that pivotally supports the first link member above the front frame so as to be able to turn in an up-down direction; the second supporting part may have a second pivotally supporting portion that pivotally supports the second link member above the front frame so as to be able to turn in the up-down direction; and the second pivotally supporting portion may be located at a lower level than the first pivotally supporting portion.

In this configuration, of the first pivotally supporting portion and the second pivotally supporting portion, the second pivotally supporting portion that is closer to a vehicle cabin, and therefore to members composing the vehicle cabin, is disposed at a position closer to the front frame. Thus, a load applied to the second pivotally supporting portion can be effectively transmitted and dispersed to the front frame and the members composing the vehicle cabin, so that deformation of the suspension housing can be further restrained.

In the above configuration, the suspension may have a damper that is fixed to the suspension housing in a posture in which the damper is inclined such that an upper side of the damper is located farther on a rear side than a lower side of the damper, and the length in the front-rear direction of the second fixing portion may be longer than the length in the front-rear direction of the first fixing portion.

In this configuration, a rear part of the suspension housing can be more firmly fixed to the front frame, and the damper that is inclined toward an obliquely upper rear side can be stably supported by the suspension housing.

In the above configuration, the front frame may extend frontward from a dashboard panel, and a coupling panel that couples together a rear end portion of the suspension housing and the dashboard panel may be provided.

In this configuration, a load input into the suspension housing through the front frame and the coupling panel can be transmitted and dispersed to the dashboard panel, so that deformation of the suspension housing can be further restrained.

The present invention can provide a front vehicle body structure of a vehicle that can restrain deformation of a suspension housing.

DETAILED DESCRIPTION

Figure 1:
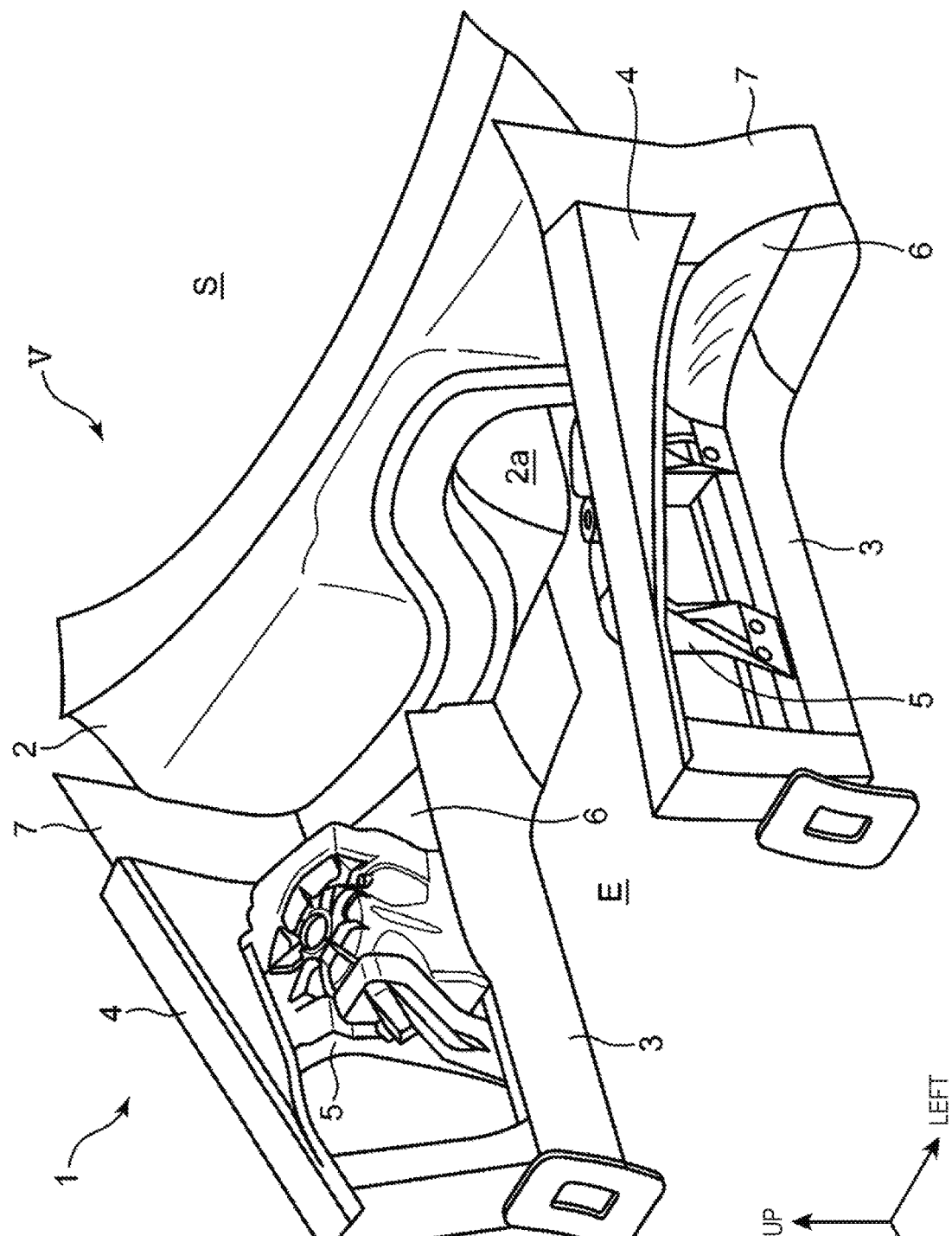
FIG. 1 is a perspective view schematically showing a front vehicle body structure of a vehicle according to the present invention.
Figure 2:
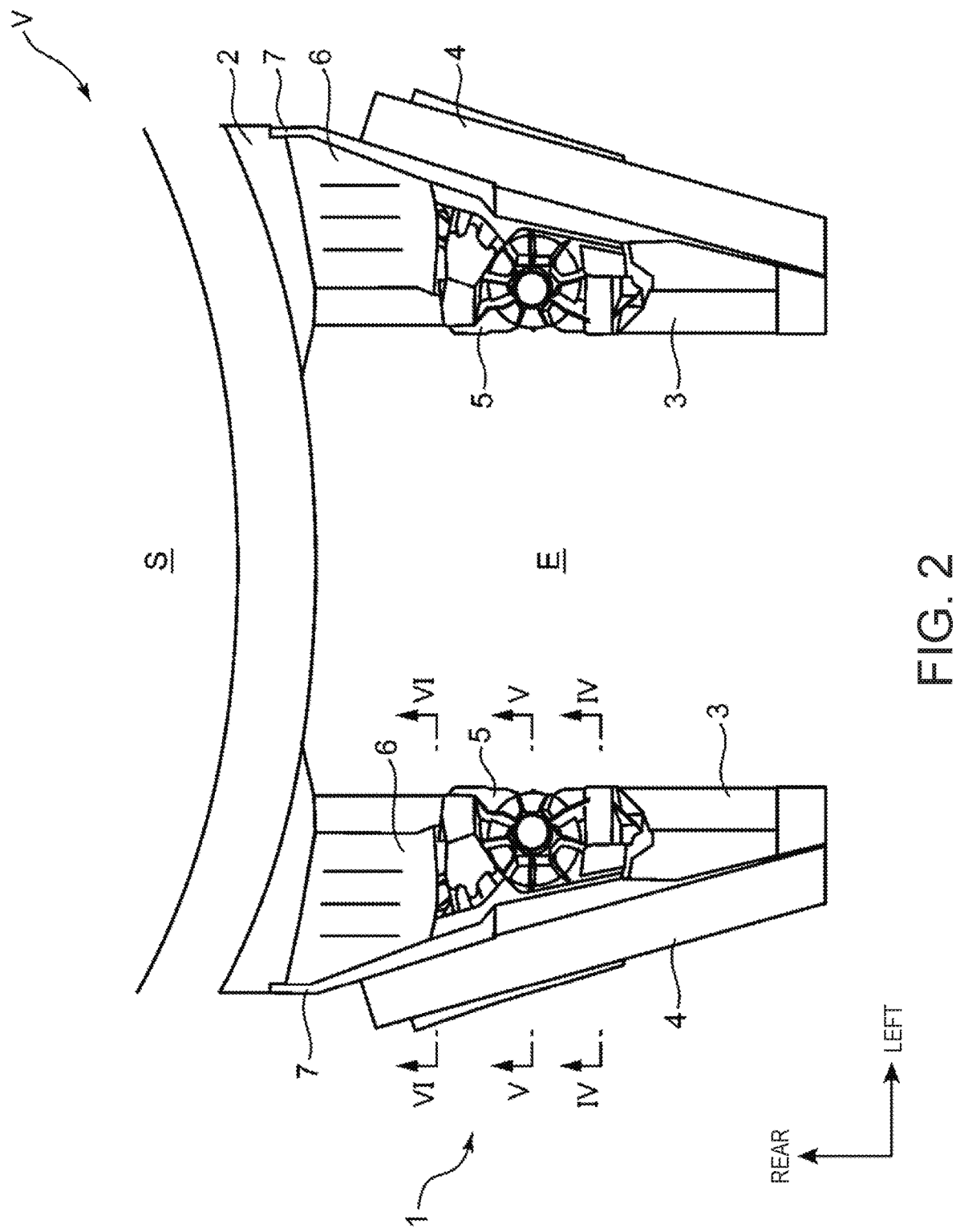
FIG. 2 is a top view schematically showing the front vehicle body structure of the vehicle.
Figure 3:
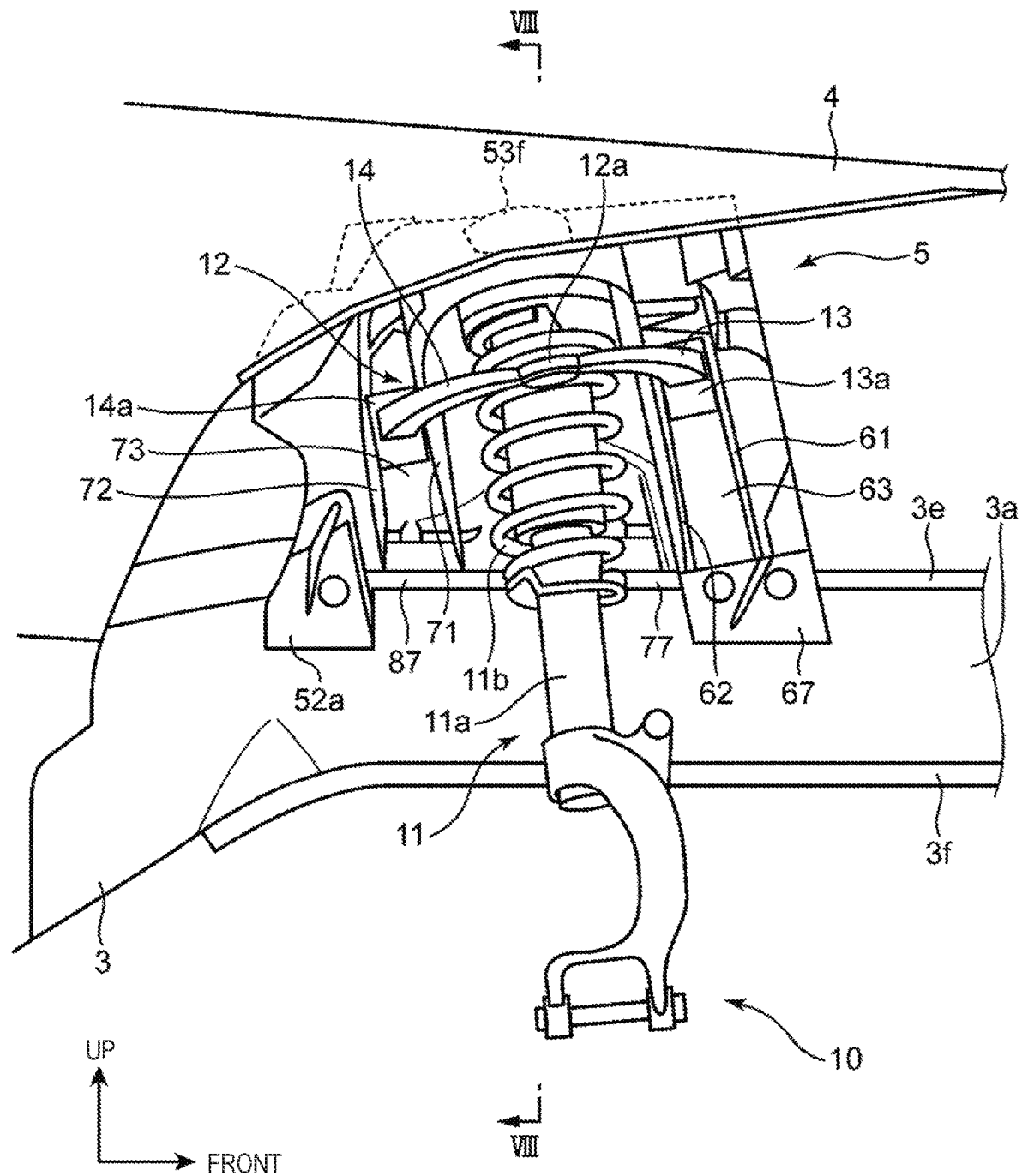
FIG. 3 is a schematic side view showing part of the front vehicle body structure of the vehicle as seen from an outer side in a vehicle width direction.

An embodiment of the present invention will be described below in detail based on the drawings. FIG. 1 is a perspective view schematically showing the structure of a front vehicle body 1 of a vehicle V according to the present invention. FIG. 2 is a top view schematically showing the structure of the front vehicle body 1 of the vehicle V. FIG. 3 is a side view schematically showing part of the front vehicle body 1 of the vehicle V. FIG. 3 is a view of part of a right-side part, with the viewing direction oriented frontward, of the front vehicle body 1 of the vehicle V as seen from an outer side in a vehicle width direction. Hereinafter, a front-rear direction of the vehicle will be referred to simply as a front-rear direction, and where appropriate, the vehicle width direction will be referred to as a right-left direction. Right and left with the viewing direction oriented frontward will be referred to simply as right and left. In the drawings, "in" means an inner side in the vehicle width direction and "out" means an outer side in the vehicle width direction.

At a front part of the vehicle V, a dashboard panel 2 is provided that forms a front end portion of a vehicle cabin S and defines an engine compartment E (a part where an engine unit (not shown) composed of an engine, a transmission, etc. is installed) and the vehicle cabin S. The dashboard panel 2 is a panel extending in an up-down direction and the vehicle width direction. In this embodiment, the vehicle V is a front-engine, rear-wheel-drive vehicle (a so-called FR vehicle) configured such that an output of the engine installed at the front part is transmitted to the rear wheels, and a tunnel 2a through which a propeller shaft is passed is formed at a center in the vehicle width direction of the dashboard panel 2.

At the front part of the vehicle V, front frames 3, apron reinforcements 4, and suspension housings 5 are provided. At the front part of the vehicle V, coupling panels 6 each interposed between the suspension housing 5 and the dashboard panel 2 is provided. The front frames 3, the apron reinforcements 4, the suspension housings 5, and the coupling panels 6 are right and left pairs of vehicle body constituent members. At the front part of the vehicle V, suspensions 10 are provided. The suspensions 10 are respectively provided on the right and left sides so as to correspond to a right and left pair of front wheels. The suspensions 10 are not shown in FIG. 1 and FIG. 2.

The front structure of the vehicle V is symmetrical in the right-left direction, and therefore the structure on one of the right and left sides will be described below.

<Apron Reinforcement>

The apron reinforcement 4 is a reinforcement member extending in the front-rear direction. The apron reinforcement 4 extends frontward from a hinge pillar 7 to which a hinge of a front door of the vehicle is mounted. A front part of the apron reinforcement 4 independently forms a closed cross-sectional part extending in the front-rear direction, while a rear part of the apron reinforcement 4 forms a closed cross-sectional part extending in the front-rear direction together with the suspension housing 5 as will be described later.

<Front Frame>

Figure 4:
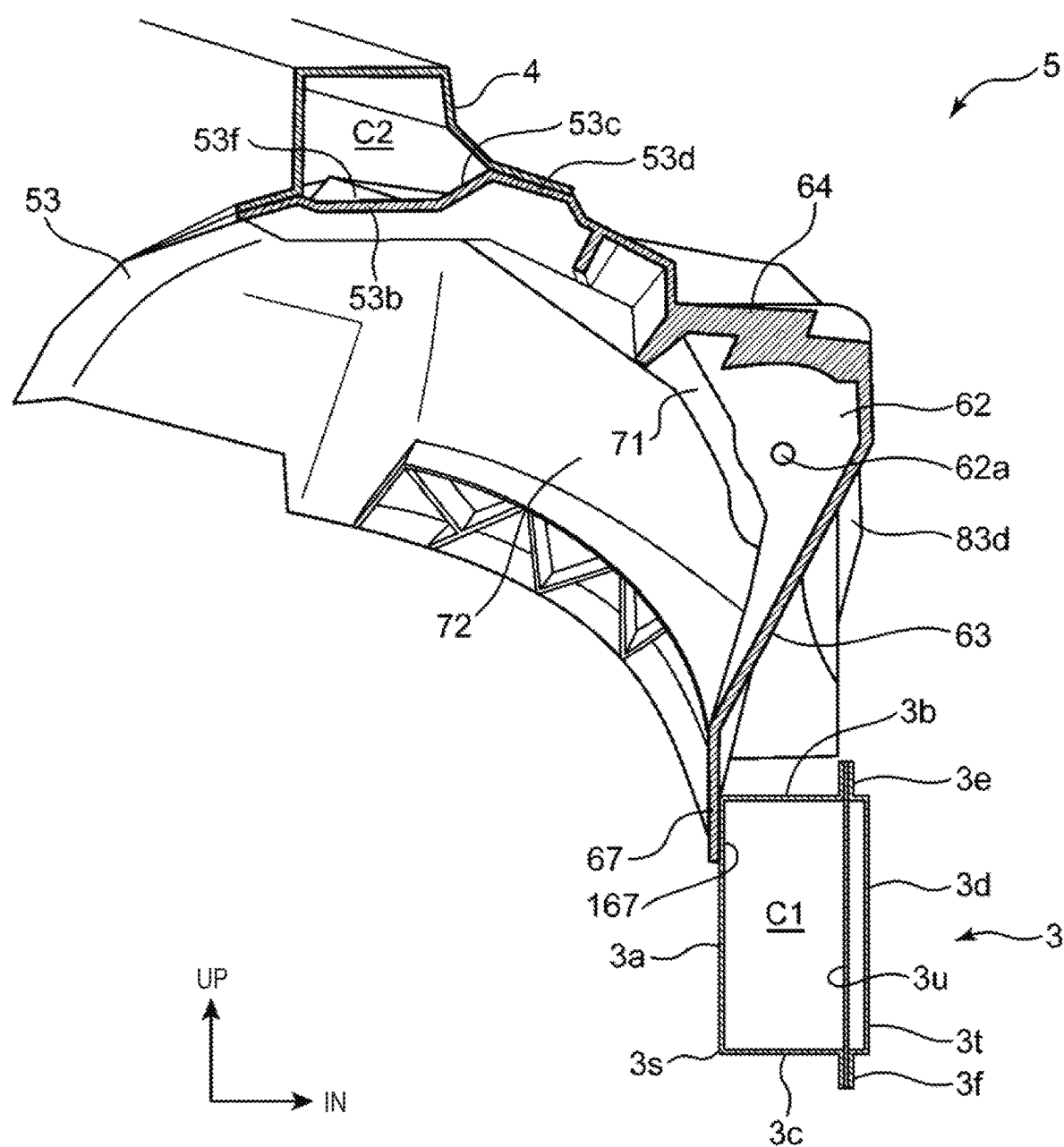
FIG. 4 is a schematic view of section IV-IV of FIG. 2.
Figure 5:
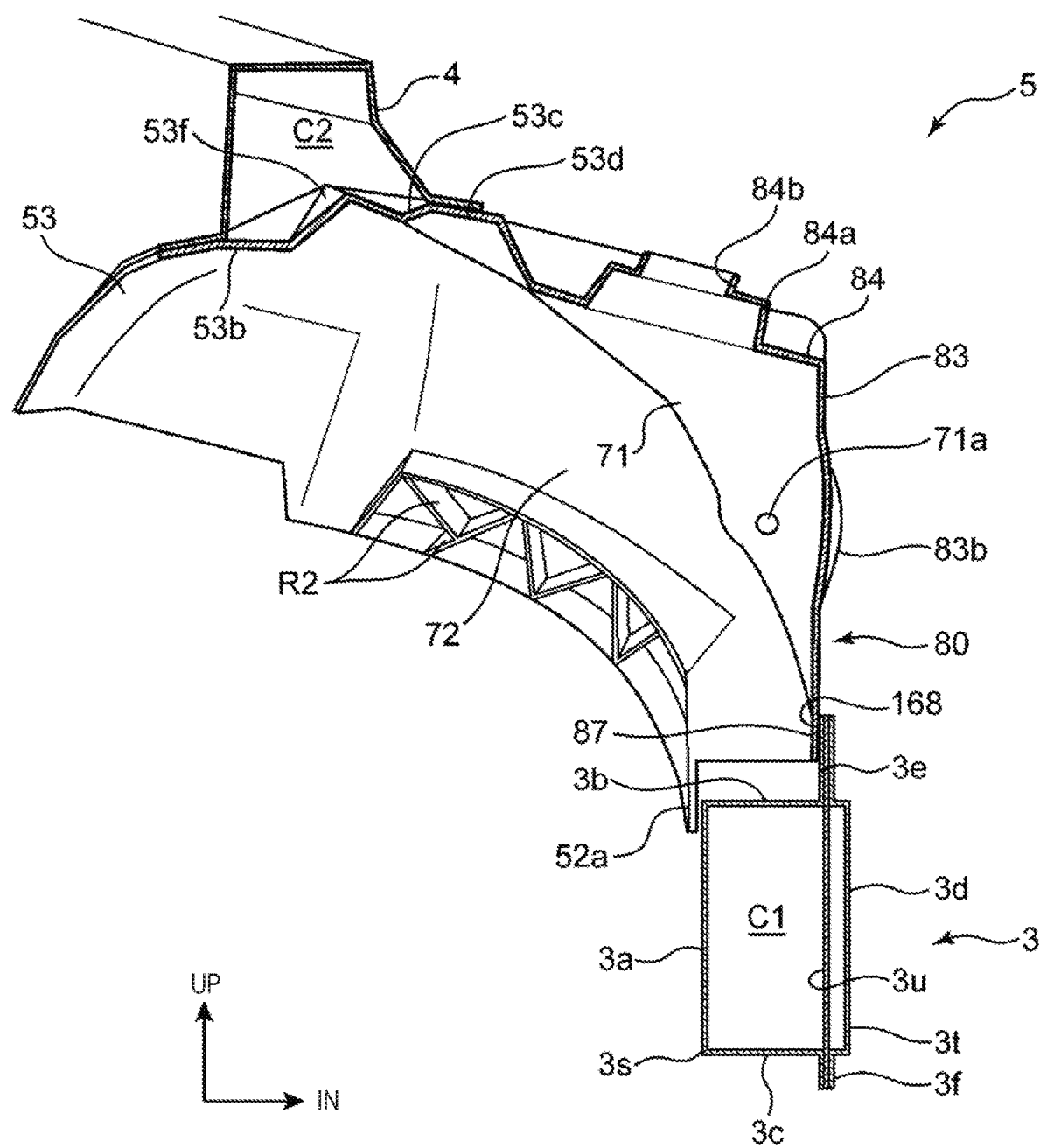
FIG. 5 is a schematic view of section V-V of FIG. 2.
Figure 6:
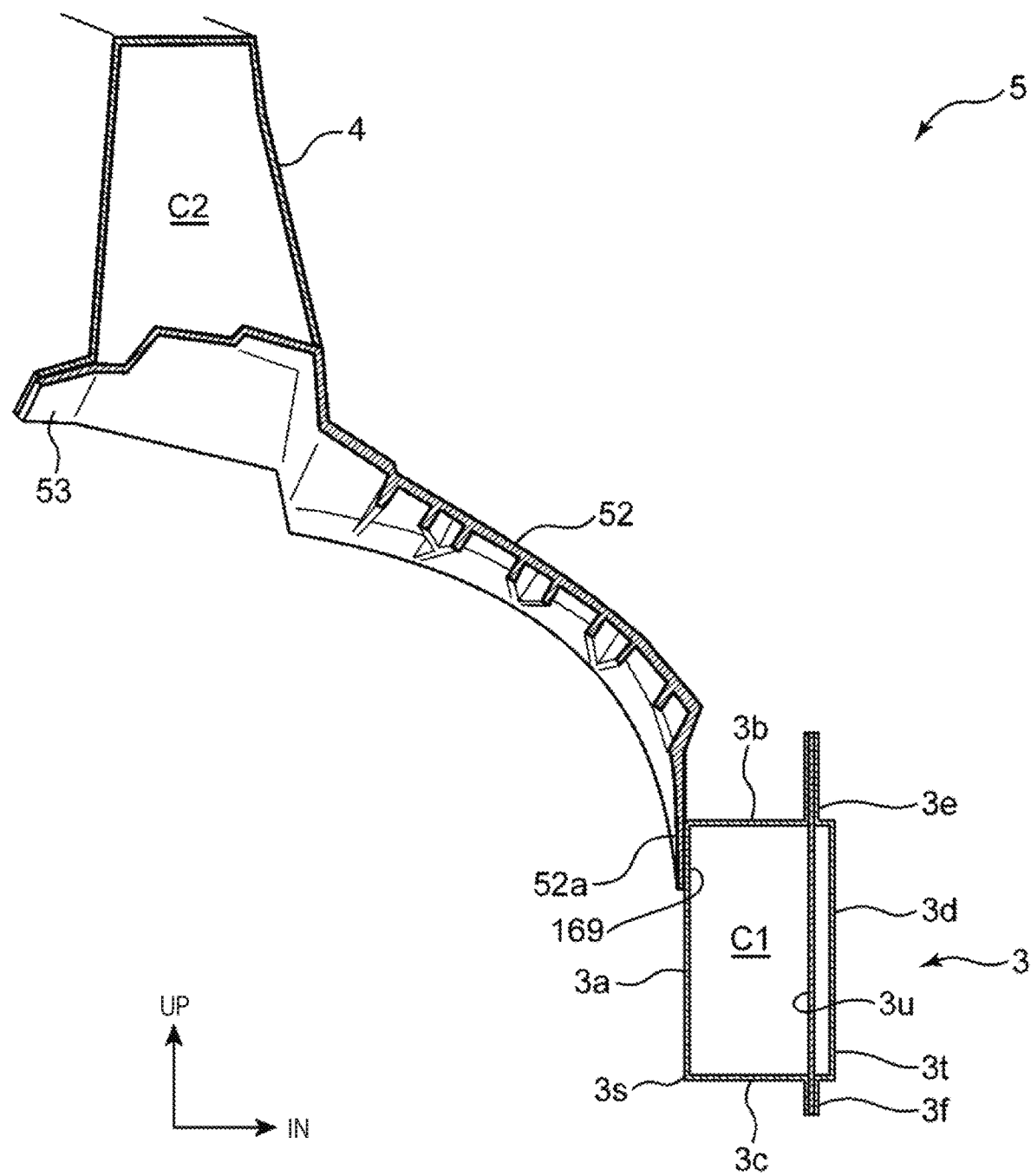
FIG. 6 is a schematic view of section VI-VI of FIG. 2.

FIG. 4 is a schematic view showing a close-up of section IV-IV of FIG. 2. FIG. 5 is a schematic view showing a close-up of section V-V of FIG. 2. FIG. 6 is a schematic view showing a close-up of section VI-VI of FIG. 2.

The front frame 3 is a vehicle body rigid member that forms a closed cross-sectional part C1 extending in the front-rear direction. The front frame 3 is fixed to the dashboard panel 2 and extends frontward from the dashboard panel 2. The front frame 3 is disposed at a position below the apron reinforcement 4 and on the inner side in the vehicle width direction of the apron reinforcement 4. For example, the right front frame 3 is disposed at a position in a direction of about 45 degrees toward an obliquely lower left side relative to the right apron reinforcement 4. Between the apron reinforcement 4 and the front frame 3 is provided a space in which a wheel well to cover a front wheel (not shown) can be formed.

As shown in FIG. 4, the closed cross-sectional part C1 has a substantially rectangular parallelepiped shape elongated in the up-down direction, and the front frame 3 has: a first side surface part 3a extending in the up-down direction and the front-rear direction and forming an outer side surface in the vehicle width direction of the front frame 3; an upper surface part 3b extending inward in the vehicle width direction from an upper edge of the first side surface part 3a and forming an upper surface of the front frame 3; a lower surface part 3c extending inward in the vehicle width direction from a lower edge of the first side surface part 3a and forming a lower surface of the front frame 3; and a second side surface part 3d extending in the up-down direction between an inner edge in the vehicle width direction of the upper surface part 3b and an inner edge in the vehicle width direction of the lower surface part 3c and forming an inner side surface in the vehicle width direction of the front frame 3. The front frame 3 further includes an upper flange 3e extending upward from near the inner edge in the vehicle width direction of the upper surface part 3b, i.e., the upper surface of the front frame 3, and a lower flange 3f extending downward from near the inner edge in the vehicle width direction of the lower surface part 3c, i.e., the lower surface of the front frame 3. The upper flange 3e and the lower flange 3f extend in the front-rear direction along the entire length of the front frame 3.

Each front frame 3 is made of a sheet-shaped steel material, for example, and is formed by joining together three members: a front frame outer part 3s with a substantially top-hat-shaped cross-section that is provided on the outer side in the vehicle width direction and protrudes outward in the vehicle width direction; a front frame inner part 3t with a substantially top-hat-shaped cross-section that is provided on the inner side in the vehicle width direction and protrudes slightly inward in the vehicle width direction; and a plate-shaped flange forming panel 3u that is interposed between the front frame outer part 3s and the front frame inner part 3t and extends in the up-down direction. For example, the upper flange 3e is formed as a flange portion formed in the front frame outer part 3s, an upper end portion of the flange forming panel 3u, and a flange portion formed in the front frame inner part 3t are joined together.

<Suspension>

In this embodiment, a double-wishbone suspension is used as the suspension 10. The suspension 10 includes: a knuckle (not shown) fixed to a tire (not shown); a lower arm (not shown) coupled to the knuckle and supporting the tire through the knuckle; an upper arm 12 (a so-called A-arm) disposed above the lower arm and, like the lower arm, coupled to the knuckle and supporting the tire through the knuckle; and a damper 11. The damper 11 includes a shock absorber 11*a* and a coil spring 11*b* installed so as to surround an outer periphery of the shock absorber 11*a*.

Figure 7:
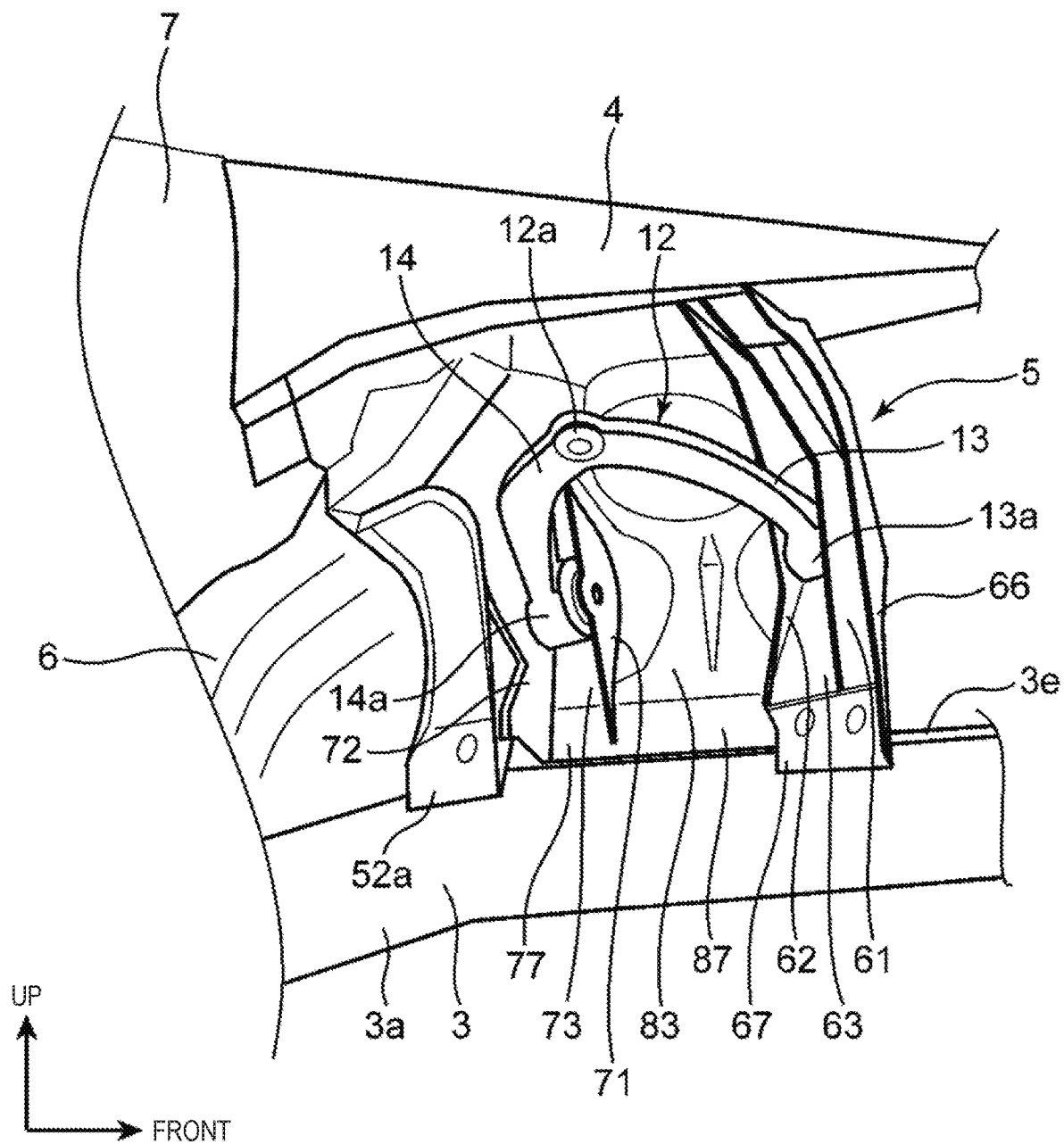
FIG. 7 is a schematic perspective view of part of the front vehicle body structure of the vehicle as seen from the outer side in the vehicle width direction.

FIG. 7 is a schematic perspective view of part of the right-side part of the front vehicle body 1 of the vehicle V as seen from an obliquely lower right side. The damper 11 is omitted from FIG. 7 as compared with FIG. 3.

The upper arm 12 has a knuckle fixing portion 12*a* to which an upper end of the knuckle is fixed. The knuckle fixing portion 12*a* is provided at an outermost end in the vehicle width direction of the upper arm 12, and the upper arm 12 includes a first arm 13 extending from the knuckle fixing portion 12*a* while curving frontward and inward in the vehicle width direction, and a second arm 14 extending from the knuckle fixing portion 12*a* while curving rearward and inward in the vehicle width direction. The first arm 13 is one example of a "first link member," and the second arm 14 is one example of a "second link member."

A first pivotally supported portion 13*a* and a second pivotally supported portion 14*a* each pivotally supported by the suspension housing 5 are provided at an inner end in the vehicle width direction of the first arm 13 and an inner end in the vehicle width direction of the second arm 14, respectively. The first pivotally supported portion 13*a* and the second pivotally supported portion 14*a* are fixed to the suspension housing 5 so as to be able to rotate around an axis extending in the front-rear direction, and the upper arm 12 is supported by the suspension housing 5 so as to be able to turn in the up-down direction around a rotational central axis of these pivotally supported portions 13*a*, 14*a*.

Figure 8:
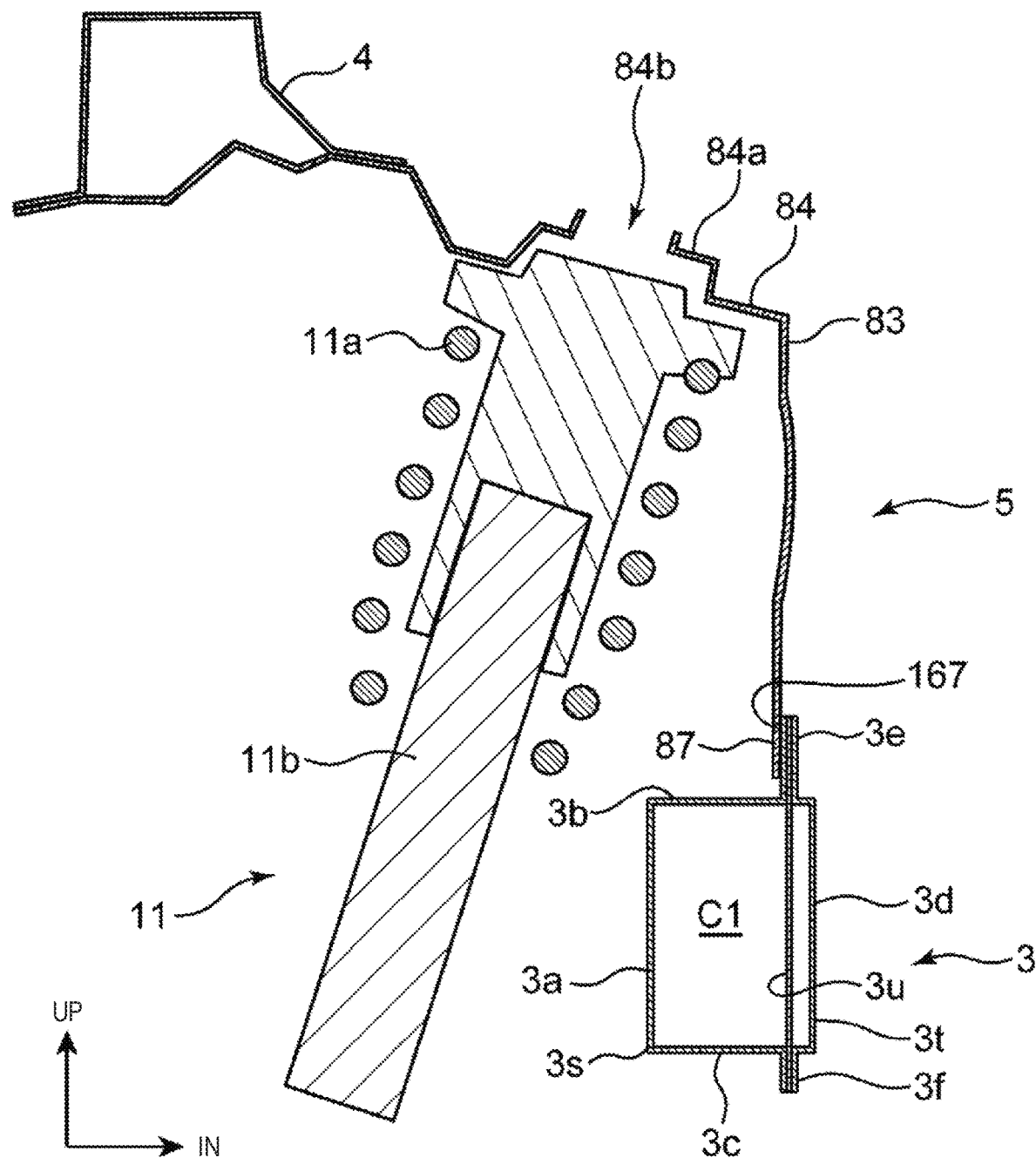
FIG. 8 is a schematic view of section VIII-VIII of FIG. 3.

The damper 11 is supported by the suspension housing 5 and the lower arm in a posture in which the damper 11 extends in the up-down direction. More specifically, a lower end portion of the damper 11 is supported by the lower arm while an upper end portion of the damper 11 is supported by the suspension housing 5. As shown in FIG. 3, the damper 11 is supported in a rearward tilted posture in which the damper 11 is inclined toward an obliquely upper rear side (i.e., a posture in which the upper side of the damper 11 is located farther on the rear side than the lower side). Moreover, as shown in FIG. 8 that is a schematic view of section VIII-VIII of FIG. 3, the damper 11 is supported in an inward tilted posture in which the damper 11 is inclined toward an obliquely upper inner side (i.e., a posture in which the upper side of the damper 11 is located farther on the inner side in the vehicle width direction than the lower side).

<Suspension Housing>

The suspension housing 5 is a member to which components of the suspension 10 are mounted. As described above, the upper end portion of the damper 11 and the pivotally supported portions 13*a*, 14*a* of the upper arm 12 are mounted to the suspension housing 5.

The suspension housing 5 has a shape of a housing that houses the damper 11 and opens at a lower end, and is fixed to the front frame 3 and the apron reinforcement 4 so as to cover the upper side of the wheel well. As described above, the front frame 3 is disposed below the apron reinforcement 4 and on the inner side in the vehicle width direction of the apron reinforcement 4. Accordingly, the suspension housing 5 as a whole has a shape extending from the apron reinforcement 4 toward the front frame 3 in a direction downward and inward in the vehicle width direction, and bridges a space between these members.

As shown in FIG. 2, etc., a rear end portion of the suspension housing 5 is further fixed to the coupling panel 6. The coupling panel 6 is a panel member, of which a rear part extends substantially horizontally while a front part is inclined toward an obliquely upper front side such that the front side of the front part is located farther on the upper side than the rear side thereof. The coupling panel 6 is fixed to the dashboard panel 2 so as to extend frontward from the dashboard panel 2. Thus, the suspension housing 5 is coupled to the dashboard panel 2 through the front frame 3 and the coupling panel 6. An outer edge in the vehicle width direction of the coupling panel 6 is further fixed to the hinge pillar 7.

Formed by aluminum die casting, the suspension housing 5 in this embodiment is a lightweight, intricately shaped suspension housing 5. Alternatively, the suspension housing 5 may be formed by performing press-working, etc. on a metal sheet member.

Figure 9:
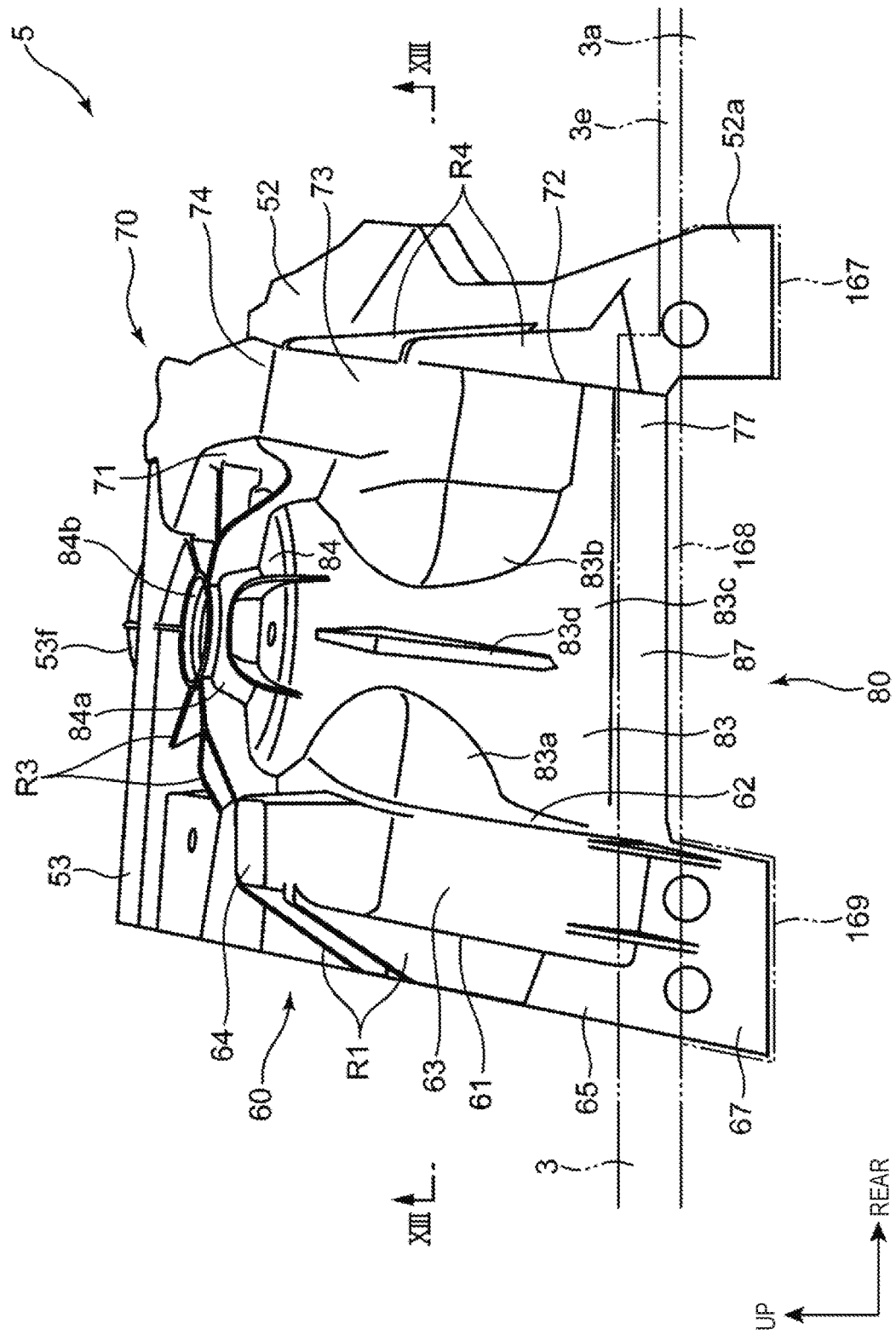
FIG. 9 is a schematic side view of a suspension housing as seen from an inner side in the vehicle width direction.
Figure 10:
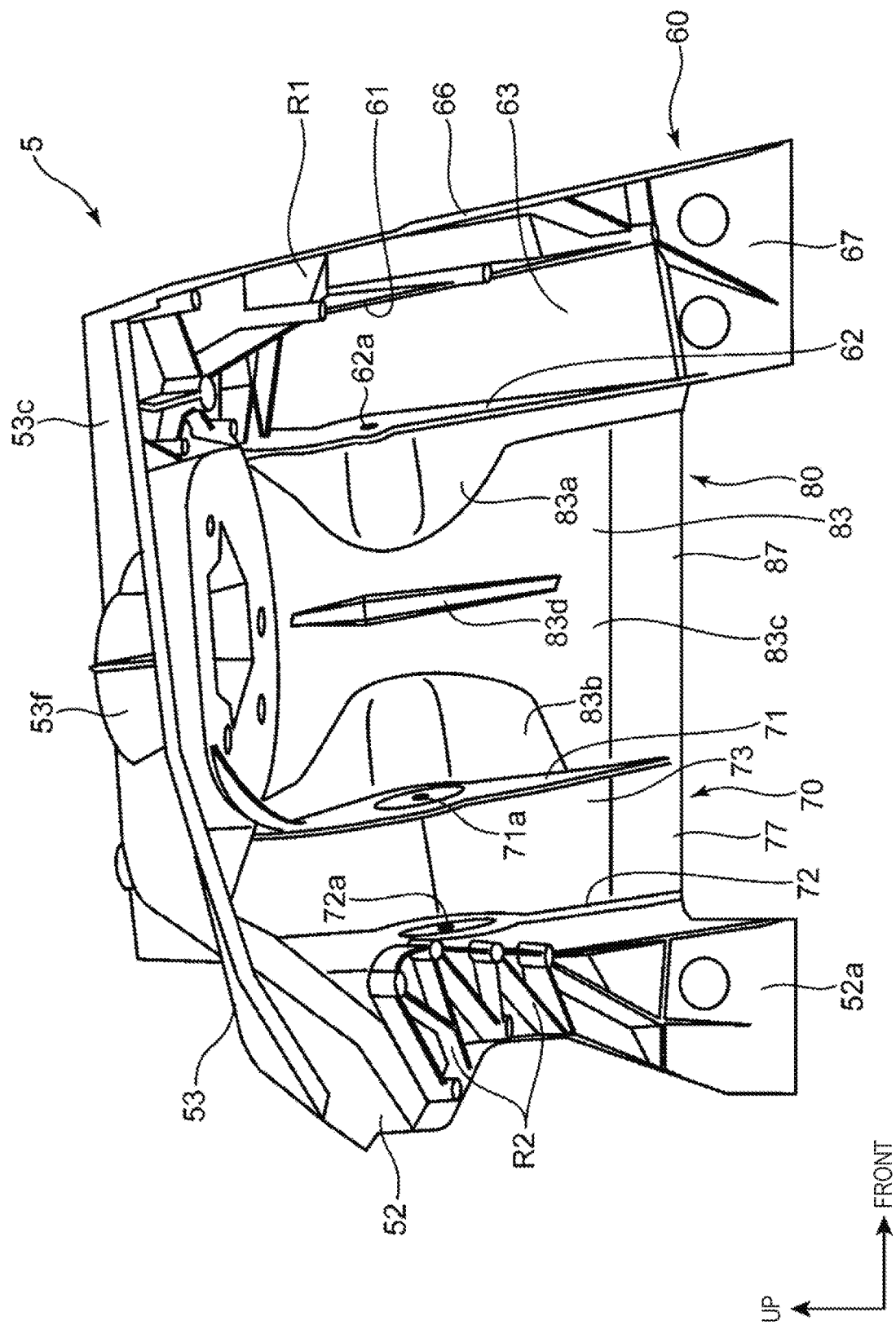
FIG. 10 is a schematic side view of the suspension housing as seen from the outer side in the vehicle width direction.
Figure 11:
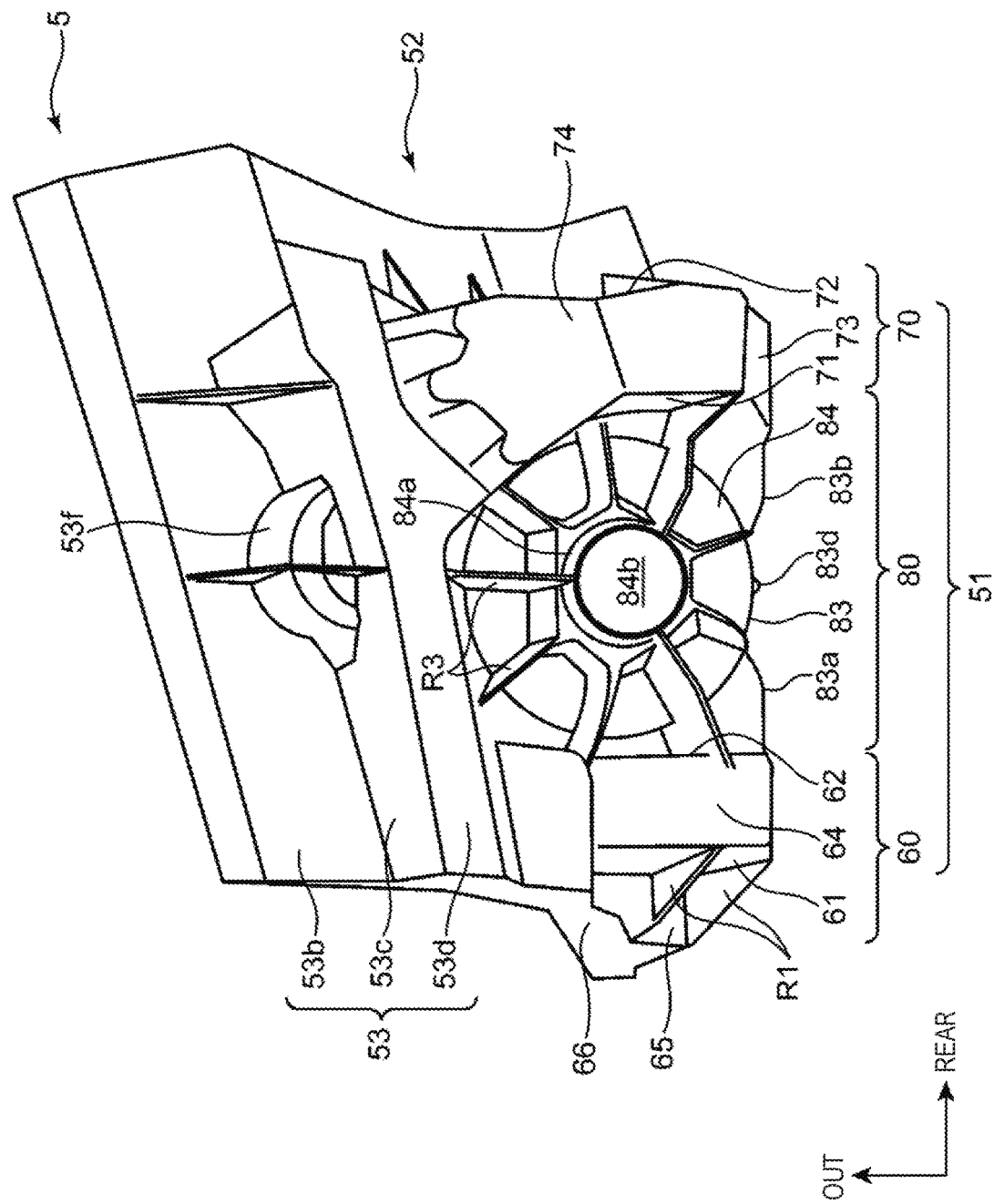
FIG. 11 is a schematic top view of the suspension housing.
Figure 12:
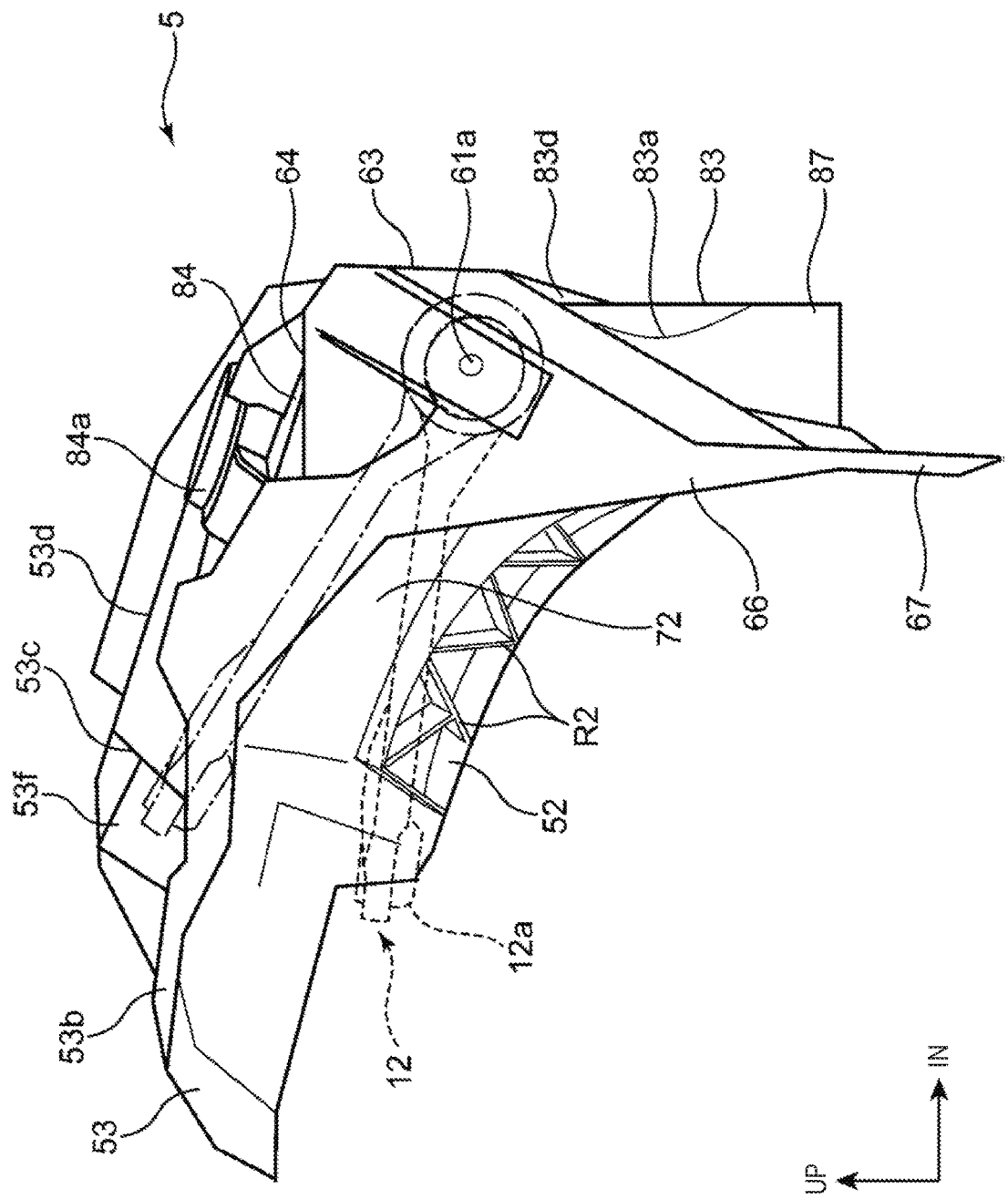
FIG. 12 is a schematic front view of the suspension housing.
Figure 13:
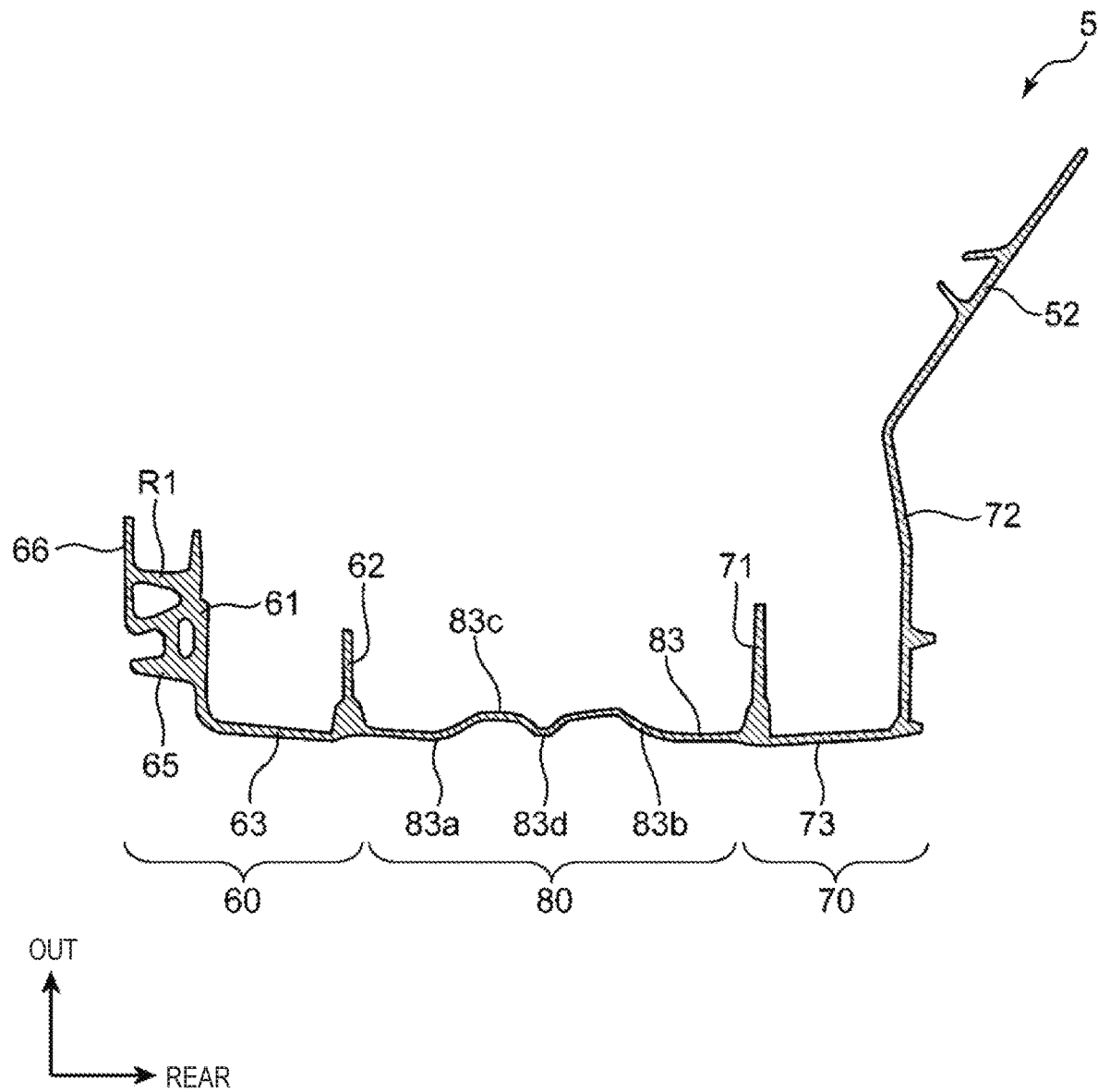
FIG. 13 is a schematic view of section XIII-XIII of FIG. 9.

FIG. 9 is a schematic side view of the suspension housing 5 alone as seen from the inner side in the vehicle width direction. FIG. 10 is a schematic side view of the suspension housing 5 alone as seen from the outer side in the vehicle width direction. FIG. 11 is a schematic top view of the suspension housing 5 alone. FIG. 12 is a schematic front view of the suspension housing 5 alone. FIG. 13 is a schematic view of section XIII-XIII of FIG. 9.

As shown in FIG. 11, the suspension housing 5 is roughly composed of a suspension fixing section 51 which is a part of the suspension housing 5 except for the rear end portion and an outer portion in the vehicle width direction and to which the suspension 10 is fixed; a rear coupling section 52 extending rearward from the suspension fixing section 51 and forming the rear end portion of the suspension housing 5; and an outer coupling section 53 extending outward in the vehicle width direction from the suspension fixing section 51 and the rear coupling section 52 and forming the outer portion in the vehicle width direction of the suspension housing 5. These sections 51, 52, 53 are integrally formed.

In terms of function and structure, the suspension fixing section 51 includes: a first arm supporting part 60 forming a front end part of the suspension fixing section 51; a second arm supporting part 70 forming a rear end part of the suspension fixing section 51; and a main part 80 forming a part between the first arm supporting part 60 and the second arm supporting part 70. The first arm supporting part 60 is one example of a "first supporting part," and the second arm supporting part 70 is one example of a "second supporting part."

<First Arm Supporting Part>

The first arm supporting part 60 is a part that supports the first arm 13 of the upper arm 12.

The first arm supporting part 60 includes: a first upright wall 61 extending in the up-down direction and the vehicle width direction; a second upright wall 62 extending substantially parallel to the first upright wall 61 on the rear side of the first upright wall 61; a first inner wall 63 extending in the up-down direction and the front-rear direction between an inner edge in the vehicle width direction of the first upright wall 61 and an inner edge in the vehicle width direction of the second upright wall 62; and a first upper wall 64 extending in the vehicle width direction and the front-rear direction between an upper edge of the first upright wall 61 and an upper edge of the second upright wall 62. These walls 61 to 64 of the first arm supporting part 60 form an open cross-sectional part opening outward in the vehicle width direction. An "open cross-section" as termed in this specification refers not to a cross-section that is fully closed or closed with a slight opening left therein by a plate member like the closed cross-sectional part C1, but to a cross-section with an opening that is formed by a plurality of bends so as to protrude into a prism shape, V-shape, etc. relative to a flat surface.

The first arm supporting part 60 further includes: a front extension portion 65 extending frontward from a front surface of the first upright wall 61; a front flange 66 extending downward from a front edge of the front extension portion 65; and a first fixed portion 67 extending downward from the front extension portion 65 and the first inner wall 63.

The first upper wall 64 forms part of a top surface of the suspension housing 5. The first upper wall 64 extends from the upper edge of the first inner wall 63 outward in the vehicle width direction, to a position on the outer side in the vehicle width direction of the first upright wall 61 and the second upright wall 62.

The first inner wall 63 forms part of an inner side surface in the vehicle width direction of the suspension housing 5. As shown in FIG. 4, etc., an upper part of the first inner wall 63 extends substantially vertically, while a lower part of the first inner wall 63 is inclined so as to be located farther on the outer side in the vehicle width direction as it extends downward.

The first upright wall 61, the front extension portion 65, and the front flange 66 form part of a front end portion of the suspension housing 5. A space between the front extension portion 65 and the first upright wall 61 is bridged by a plurality of ribs R1, and the rigidity of the first upright wall 61 is enhanced by the front extension portion 65 and these ribs R1. As shown in FIG. 10, a plurality of ribs are provided also on a lower surface of the front extension portion 65, and the rigidity of the front extension portion 65 and, as a consequence, the rigidity of the first upright wall 61 are thereby enhanced.

As shown in FIG. 13, the length in the vehicle width direction of the second upright wall 62 is set to be shorter than the length in the vehicle width direction of the first upright wall 61. As shown in FIG. 4, etc., the second upright wall 62 has such a shape that the dimension in the vehicle width direction increases toward the upper side.

As shown in FIG. 4, FIG. 12, etc., the first upright wall 61 and the second upright wall 62 have shaft holes 61a, 62a which are formed substantially at centers in the up-down direction of these upright walls and through which a shaft member for pivotally supporting the first arms 13 is inserted. As shown in FIG. 7, etc., the first pivotally supported portion 13a of the first arm 13 is housed between the first upright wall 61 and the second upright wall 62. In this housed state, the shaft member extending in the front-rear direction is passed through a hole (not shown) formed in the first pivotally supported portion 13a and the shaft holes 61a, 62a of the upright walls 61, 62, and this shaft member is fixed to the second upright wall 62, so that the first arm 13 is supported by the first arm supporting part 60 so as to be able to turn in the up-down direction.

Thus, in this embodiment, portions of the first upright wall 61 and the second upright wall 62 that respectively surround the shaft holes 61a, 62a pivotally support the first arm 13, and these portions function as the "first pivotally supporting portion" in the claims.

In this embodiment, the shaft member and, as a consequence, the first arm 13 are fixed on the rear side of the second upright wall 62. More specifically, a fixing member for fixing the shaft member is attached to the shaft member on the rear side of the second upright wall 62, and the fixing member and the shaft member are fixed to the second upright wall 62 with a tool on the rear side of the second upright wall 62.

<Second Arm Supporting Part>

The second arm supporting part 70 is a part that supports the second arm 14 of the upper arm 12.

The second arm supporting part 70 includes: a third upright wall 71 extending substantially parallel to the second upright wall 62 (i.e., extending in the up-down direction and the vehicle width direction) on the rear side of the second upright wall 62; a fourth upright wall 72 extending substantially parallel to the third upright wall 71 (i.e., extending in the up-down direction and the vehicle width direction) on the rear side of the third upright wall 71; a second inner wall 73 extending in the up-down direction and the front-rear direction between an inner edge in the vehicle width direction of the third upright wall 71 and an inner edge in the vehicle width direction of the fourth upright wall 72; and a second upper wall 74 extending in the vehicle width direction and the front-rear direction between an upper edge of the third upright wall 71 and an upper edge of the fourth upright wall 72. These walls 71 to 74 of the second arm supporting part 70 form an open cross-sectional part opening outward in the vehicle width direction.

The second arm supporting part 70 further includes a second fixed portion 77 extending downward from the second inner wall 73.

The second upper wall 74 forms part of the top surface of the suspension housing 5. The second upper wall 74 extends outward in the vehicle width direction from the upper edge of the second inner wall 73 while being slightly inclined such that the outer side in the vehicle width direction of the second upper wall 74 is located farther on the upper side than the inner side in the vehicle width direction thereof.

The second inner wall 73 forms part of the inner side surface in the vehicle width direction of the suspension housing 5. As with the first inner wall 63, an upper part of the second inner wall 73 extends substantially vertically, while a lower part of the second inner wall 73 is inclined so as to be located farther on the outer side in the vehicle width direction as it extends downward.

As shown in FIG. 5, etc., as with the second upright wall 62, the third upright wall 71 has such a shape that the dimension in the vehicle width direction increases toward the upper side. However, as shown in FIG. 13, the third upright wall 71 extends farther outward in the vehicle width direction than the second upright wall 62. The fourth upright wall 72 extends farther outward in the vehicle width direction than the first, second, and third upright walls 61, 62, 71, and the dimension in the vehicle width direction of the fourth upright wall 72 is larger than that of the other upright walls. Moreover, the fourth upright wall 72 is connected to the rear coupling section 52 having a plurality of ribs R2 formed on a lower surface thereof. Thus configured, the second arm supporting part 70 has a higher rigidity than the first arm supporting part 60 in this embodiment.

The third upright wall 71 and the fourth upright wall 72 have shaft holes 71a, 72a, respectively, which are formed substantially at center in the up-down direction of the third upright wall 71 and substantially at center in the up-down direction of inner part in the vehicle width direction of the fourth upright wall 72 and into which a shaft member for pivotally supporting the second arm 14 is inserted. The second pivotally supported portion 14a of the second arm 14 is housed between the third upright wall 71 and the fourth upright wall 72. In this housed state, the shaft member extending in the front-rear direction is passed through a hole (not shown) formed in the second pivotally supported portion 14a and the shaft holes 71a, 72a of the upright walls 71, 72, and this shaft member is fixed to the third upright wall 71, so that the second arm 14 is supported by the second arm supporting part 70 so as to be able to turn in the up-down direction.

In this embodiment, the shaft member and, as a consequence, the second arm 14 are fixed on the front side of the third upright wall 71. More specifically, a fixing member for fixing the shaft member is attached to the shaft member on the front side of the third upright wall 71, and the fixing member and the shaft member are fixed to the third upright wall 71 with a tool on the front side of the third upright wall 71.

The levels of the shaft holes 71a, 72a formed in the third upright wall 71 and the fourth upright wall 72 are lower than the levels of the shaft holes 61a, 62a formed in the first upright wall 61 and the second upright wall 62. Accordingly, the upper arm 12 is supported by the suspension housing 5 in a posture in which the upper arm 12 is inclined toward an obliquely lower rear side as seen in a side view, with the second pivotally supported portion 14a of the second arm 14 located at a lower level than the first pivotally supported portion 13a of the first arm 13.

As described above, in this embodiment, portions of the third upright wall 71 and the fourth upright wall 72 that respectively surround the shaft holes 71a, 72a pivotally support the second arm 14, and these portions function as examples of a "second pivotally supporting portion."

<Main Part>

The main part 80 includes a third upper wall 84 extending in the vehicle width direction and the front-rear direction between the first upper wall 64 and the second upper wall 74, and a third inner wall 83 extending substantially vertically downward from an inner edge in the vehicle width direction of the third upper wall 84.

As shown in FIG. 5, etc., the third upper wall 84 is inclined such that the inner side in the vehicle width direction of the third upper wall 84 is located farther on the lower side than the outer side in the vehicle width direction thereof. The third upper wall 84 has a damper fixing portion 84a to which the upper end portion of the damper 11 is fixed. The damper fixing portion 84a protrudes upward substantially at a center of the third upper wall 84, and has a substantially disc shape with a through-hole 84b formed at a center as seen in a top view. As shown in FIG. 13, the damper 11 is housed between the second upright wall 62 and the third upright wall 71 as seen in a side view, and is fixed to the damper fixing portion 84a with the upper end portion of the damper 11 passed through the through-hole 84b of the damper fixing portion 84a. A plurality of ribs R3 extending in the up-down direction are formed around the damper fixing portion 84a, and the rigidity of the damper fixing portion 84a is enhanced by these ribs R3.

The main part 80 further includes a third fixed portion 87 extending downward from the third inner wall 83. The third fixed portion 87 and the second fixed portion 77 are continuous with each other in the front-rear direction, and these fixed portions 77, 87 have a form of a flat surface extending in the front-rear direction. Specifically, the fixed portions 77, 87 are formed such that inner side surfaces and outer side surfaces in the vehicle width direction thereof are continuous with each other and form a flat surface extending in the front-rear direction. The levels of a lower edge of the third fixed portion 87 and a lower edge of the second fixed portion 77 are higher than the level of a lower edge of the first fixed portion 67. In other words, the first fixed portion 67 extends farther downward than the third fixed portion 87 and the second fixed portion 77.

As described above, the third inner wall 83 extends basically in the vertical direction. However, a part of the third inner wall 83 that is continuous with the second upright wall 62 and a part thereof that is continuous with the third upright wall 71 partially bulge inward in the vehicle width direction. Specifically, as shown in FIG. 10, FIG. 13, etc., a portion of a front-side part of the third inner wall 83 that surrounds the shaft hole 62a of the second upright wall 62 as seen in a side view is curved so as to bulge inward in the vehicle width direction while extending frontward from a portion 83c that is located at a center in the front-rear direction of the third inner wall 83 and extends vertically. This bulging portion forms a front bulge 83a bulging inward in the vehicle width direction. Moreover, a portion of a rear-side part of the third inner wall 83 that surrounds the shaft hole 71a of the third upright wall 71 as seen in a side view is curved so as to bulge inward in the vehicle width direction while extending rearward from the center portion 83c in the front-rear direction of the third inner wall 83. This bulging portion forms a rear bulge 83b bulging inward in the vehicle width direction.

A reinforcing portion 83d projecting inward in the vehicle width direction is formed in the portion 83c of the third inner wall 83 between the front bulge 83a and the rear bulge 83b. The reinforcing portion 83d is bent so as to protrude inward in the vehicle width direction. In this embodiment, the reinforcing portion 83d is formed as a portion of the third inner wall 83 is pushed out so as to project inward in the vehicle width direction with a constant plate thickness. The reinforcing portion 83d is formed substantially at a center portion in the front-rear direction of the third inner wall 83 and extends in the up-down direction at this portion. The rigidity of the third inner wall 83 and, as a consequence, the rigidity of the main part 80 are enhanced by the reinforcing portion 83d.

<Rear Coupling Section>

The rear coupling section 52 extends rearward from a rear surface of the fourth upright wall 72. The rear coupling section 52 is shaped so as to be curved downward and inward in the vehicle width direction. In this embodiment, a plurality of ribs R4 extending so as to connect the rear surface of the fourth upright wall 72 and an upper surface of the rear coupling section 52 to each other are provided, and the rigidity of the fourth upright wall 72 and the rear coupling section 52 is enhanced by these ribs R4. Moreover, as mentioned above, the ribs R2 are provided in a lattice pattern on the lower surface of the rear coupling section 52, and the rigidity of the rear coupling section 52 and the rigidity of the fourth upright wall 72 continuous with the rear coupling section 52 are enhanced also by these ribs R2.

A lower end portion of the rear coupling section 52 extends in the up-down direction and functions as a fourth fixed portion 52a. The fourth fixed portion 52a is also an inner end in the vehicle width direction of the rear coupling section 52. The fourth fixed portion 52a extends to a level equivalent to that of the first fixed portion 67, and extends farther downward than the third fixed portion 87 and the second fixed portion 77.

<Outer Coupling Section>

The outer coupling section 53 extends outward in the vehicle width direction from inner edges in the vehicle width direction of the first upper wall 64, the second upper wall 74, the third upper wall 84, and the rear coupling section 52. A step is formed in the outer coupling section 53 such that an outer part in the vehicle width direction of the outer coupling section 53 is located below an inner part in the vehicle width direction thereof. The outer coupling section 53 includes: a first lateral wall 53b forming the outer part in the vehicle width direction and extending in the vehicle width direction and the front-rear direction; a rising wall 53c extending upward from an inner edge in the vehicle width direction of the first lateral wall 53b; and a second lateral wall 53d extending inward in the vehicle width direction from an upper edge of the rising wall 53c. As shown in FIG. 4, etc., the first lateral wall 53b extends substantially horizontally, while the second lateral wall 53d is slightly inclined toward an obliquely lower inner side such that the inner side in the vehicle width direction of the second lateral wall 53d is located farther on the lower side than the outer side in the vehicle width direction thereof.

As shown in FIG. 4, etc., the suspension housing 5 is disposed such that the outer coupling section 53 abuts against the apron reinforcement 4 from the lower side, and the suspension housing 5 is fixed to the apron reinforcement 4 at the outer coupling section 53. Thus, as mentioned above, a closed cross-sectional part C2 extending in the front-rear direction is formed between the apron reinforcement 4 and an upper surface of the outer coupling section 53.

A recessed portion 53f protruding upward is provided substantially at a center portion in the front-rear direction of the first lateral wall 53b. The recessed portion 53f protrudes outward in the vehicle width direction from the rising wall 53c. In this embodiment, the recessed portion 53f has a semicircular shape protruding outward in the vehicle width direction from the rising wall 53c. This shape of the recessed portion 53f corresponds to the shape of an outer portion in the vehicle width direction of the knuckle fixing portion 12a. More specifically, the knuckle fixing portion 12a has a substantially circular shape as seen in a plan view, and the recessed portion 53f has a semicircular shape corresponding to the shape of the outer portion in the vehicle width direction of the knuckle fixing portion 12a that is semicircular as seen in a plan view.

As shown in FIG. 12, the recessed portion 53f is formed on a turning path of the knuckle fixing portion 12a so as to extend in the up-down direction along this turning path. Thus, when the upper arm 12 turns upward from a state indicated by the dashed lines to the state indicated by the dotted-dashed lines in FIG. 13, the knuckle fixing portion 12a enters the recessed portion 53f, so that the knuckle fixing portion 12a and the suspension housing 5 do not interfere with each other. Specifically, the recessed portion 53f is formed such that the outer portion in the vehicle width direction of the knuckle fixing portion 12a enters the recessed portion 53f when the upper arm 12 has turned to an uppermost position. In this embodiment, the recessed portion 53f is provided on the outer side in the vehicle width direction of the damper fixing portion 84a, at roughly the same position as the position of the damper fixing portion 84a in the front-rear direction.

<Mounting Structure of Suspension Housing and Front Frame>

The suspension housing 5 configured as has been described above is fixed to the front frame 3 as the fixed portions 67, 77, 87, 52a are joined to the front frame 3.

As shown in FIG. 4 and FIG. 9, the first fixed portion 67 is joined to the first side surface part 3a forming the outer side surface in the vehicle width direction of the front frame 3. Specifically, a first fixing portion 167 to which the first fixed portion 67 is fixed is provided in the first side surface part 3a of the front frame 3, and the first fixing portion 167 and the first fixed portion 67 are joined together.

As shown in FIG. 5 and FIG. 9, the second fixed portion 77 and the third fixed portion 87 are joined to the upper flange 3e of the front frame 3. Specifically, a second fixing portion 168 to which both the second fixed portion 77 and the third fixed portion 87 are fixed is provided in the upper flange 3e of the front frame 3, and the second fixing portion 168, the second fixed portion 77, and the third fixed portion 87 are joined together. As described above, the second fixed portion 77 and the third fixed portion 87 are continuous with each other in the front-rear direction, and the second fixing portion 168 extends over a wide area in the front-rear direction. More specifically, the length in the front-rear direction of the fixed portion combining the second fixed portion 77 and the third fixed portion 87 is longer than the length of the first fixed portion 67 and the length of the fourth fixed portion 52a, and the length in the front-rear direction of the second fixing portion 168 is longer than the length of the first fixing portion 167 and the length of a third fixing portion 169, to be described later, to which the fourth fixed portion 52a is fixed.

As shown in FIG. 6 and FIG. 9, as with the first fixed portion 67, the fourth fixed portion 52a is joined to the first side surface part 3a forming the outer side surface in the vehicle width direction of the front frame 3. Specifically, the first side surface part 3a of the front frame 3 has the third fixing portion 169 to which the fourth fixed portion 52a is fixed, and the third fixing portion 169 and the fourth fixed portion 52a are joined together.

The first fixing portion 167, the second fixing portion 168, and the third fixing portion 169 are arranged in this order from the front side in the front-rear direction. The fixed portions 67, 77, 87, 52a and the fixing portions 167 to 169 of the front frame 3 are joined together by welding, bonding with an adhesive, etc.

As shown in FIG. 4 and as described above, the upper flange 3e of the front frame 3 is located on the inner side in the vehicle width direction of the first side surface part 3a. The second fixing portion 168 is offset inward in the vehicle width direction relative to the first fixing portion 167 and the third fixing portion 169, and thus the second fixed portion 77 and the third fixed portion 87 are joined to the front frame 3 at a position offset inward in the vehicle width direction relative to the first fixed portion 67 and the fourth fixed portion 52a.

The fixed portions 67, 77, 87, 52a are joined to the fixing portions 167 to 169 in a state of abutting against outer side surfaces in the vehicle width direction of these fixing portions 167 to 169 (the outer side surface in the vehicle width direction of the first side surface part 3a and the outer side surface in the vehicle width direction of the upper flange 3e). The suspension housing 5 is joined to the front frame 3, for example, as the fixed portions 67, 77, 87, 52a are pressed against the outer side surfaces in the vehicle width direction of the fixing portions 167 to 169 from the outer side in the vehicle width direction and these portions are welded together in this state, or as the fixed portions 67, 77, 87, 52a are pressed against the outer side surfaces in the vehicle width direction of the fixing portions 167 to 169 from the outer side in the vehicle width direction, with an adhesive interposed therebetween.

<Effects and Others>

As has been described above, in this embodiment, the first arm supporting part 60 and the second arm supporting part 70 of the suspension housing 5 that respectively support the first arm 13 and the second arm 14 are respectively provided with the first fixed portion 67 and the second fixed portion 77 each joined to the front frame 3, and these first arm supporting part 60 and second arm supporting part 70 are fixed to the front frame 3. Thus, a load applied from the arms 13, 14 to the arm supporting parts 60, 70 can be appropriately transmitted and dispersed to the front frame 3, and deformation of the suspension housing 5 can be restrained.

As described above, the first arm supporting part 60 and the second arm supporting part 70 are formed so as to have higher rigidity than the main part 80. Since these arm supporting parts 60, 70 are fixed to the front frame 3, a load applied to the arm supporting parts 60, 70 can be more appropriately transmitted and dispersed to the front frame 3.

The first fixing portion 167 to which the first fixed portion 67 is joined and the second fixing portion 168 to which the second fixed portion 77 is joined are provided at positions different from each other in the vehicle width direction. Thus, deformation of the suspension housing 5 around an axis in the vehicle front-rear direction can be restrained. In particular, in this embodiment, the damper 11 is inclined such that the upper side of the damper 11 is located farther on the inner side in the vehicle width direction than the lower side thereof, and therefore a relatively large force is applied to the suspension housing 5 around the axis in the vehicle front-rear direction. Deformation of the suspension housing 5 due to such a force can be effectively restrained.

In this embodiment, the shaft holes 71a, 72a formed in the third upright wall 71 and the fourth upright wall 72 are located at a lower level than the shaft holes 61a, 62a formed in the first upright wall 61 and the second upright wall 62, and thus the portion of the rear second arm supporting part 70 that pivotally supports the second arm 14 is disposed at a position closer to the front frame 3 than the portion of the front first arm supporting part 60 that pivotally supports the first arm 13 is. In other words, the portion closer to the dashboard panel 2 of the portions that pivotally support the arms 13, 14 is disposed at a position closer to the front frame 3. Therefore, a load applied to the suspension housing 5 can be effectively transmitted and dispersed to the front frame and the dashboard panel 2, so that deformation of the suspension housing 5 can be more reliably restrained.

In particular, in this embodiment, the damper 11 is inclined toward an obliquely upper rear side (inclined such that the upper side of the damper 11 is located farther on the rear side than the lower side thereof), which makes it likely that a rearward load is applied to the suspension housing 5. With this in mind, since such a load can be reliably transmitted and dispersed to the front frame and the dashboard panel 2, deformation of the suspension housing 5 can be effectively restrained.

In this embodiment, the damper 11 is inclined toward an obliquely upper rear side and a rearward load is likely to be applied to the suspension housing 5 as described above. With this in mind, the second fixed portion 77 of the second arm supporting part 70 provided on the rear side of the first arm supporting part 60 and the third fixed portion 87 of the main part 80 are made continuous with each other in the front-rear direction. Accordingly, the length in the front-rear direction of the fixed portion combining the second fixed portion 77 and the third fixed portion 87 is longer than that of the first fixed portion 67 and the fourth fixed portion 52a. Thus, the rear part of the suspension housing 5 can be firmly fixed to the front frame 3, so that deformation of the suspension housing 5 under a rearward load applied thereto from the damper 11 can be further restrained.

In this embodiment, the rear end portion of the suspension housing 5 and the dashboard panel 2 are coupled together by the coupling panel 6. Thus, a load applied to the suspension housing 5 can be more reliably transmitted and dispersed to the dashboard panel 2.

In this embodiment, the fourth fixed portion 52a of the rear coupling section 52 and the front frame 3 are further fixed to each other on the rear side of the second arm supporting part 70. Thus, deformation of the suspension housing 5 can be more reliably restrained.

<Variations>

In the above embodiment, the case where a double-wishbone suspension is used as the suspension has been described. However, the suspension is not limited to this type and may be any suspension that includes a damper supported by the suspension housing 5 and a plurality of link members coupled to the front wheel. For example, a multi-link suspension may be used. More specifically, a plurality of link members that individually couple together a tire and a suspension housing may be provided in place of the arms. The number of these link members is not limited to two.

The detailed structure of the suspension housing 5 is not limited to that described above. For example, the rear coupling section 52 and the outer coupling section 53 may be omitted. The positions at which the ribs R1 to R4 are provided, etc. are not limited to those described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

What is claimed is:

1. A front vehicle body structure of a vehicle, comprising:
a front frame provided at a front part of the vehicle and extending in a vehicle front-rear direction;
a suspension that supports a front wheel, wherein the front frame is a vehicle body rigid member that forms a closed cross-sectional part extending in the front-rear direction; and
a suspension housing which is fixed to the front frame and to which the suspension is mounted, wherein
the suspension has a first link member that is coupled to the front wheel and a second link member that is located on a rear side of the first link member;
the suspension housing houses a damper and opens at a lower end, and is fixed to an apron reinforcement so as to cover an upper side of the front wheel;
the suspension housing has a first supporting part that supports the first link member and a second supporting part that is provided on a rear side of the first supporting part and supports the second link member;
the front frame has a first fixing portion to which the first supporting part is fixed and a second fixing portion to which the second supporting part is fixed; and
the first fixing portion and the second fixing portion are provided at positions different from each other in a vehicle width direction when viewed from a front side of the vehicle, wherein
the first supporting part includes a first upright wall extending in an up-down direction and the vehicle width direction, a second upright wall extending substantially parallel to the first upright wall on a rear side of the first upright wall, a first inner wall, and a first fixed portion extending downward from the first inner wall, the first link member being housed between the first upright wall and the second upright wall, the second supporting part includes a third upright wall extending substantially parallel to the second upright wall, a fourth upright wall extending substantially parallel to the third upright wall on a rear side of the third upright wall, a second inner wall, and a second fixed portion extending downward from the second inner wall, the second link member being housed between the third wall and the fourth upright wall, and one of the first and second fixed portions is fixed only to the outer part of the front frame, and another one of the first and second fixed portions is fixed to the inner part of the front frame in the vehicle width direction.

2. The front vehicle body structure of a vehicle according to claim 1, wherein
the first supporting part has a first pivotally supporting portion that pivotally supports the first link member above the front frame so as to be able to turn in the up-down direction;
the second supporting part has a second pivotally supporting portion that pivotally supports the second link member above the front frame so as to be able to turn in the up-down direction; and
the second pivotally supporting portion is located at a lower level than the first pivotally supporting portion.

3. The front vehicle body structure of a vehicle according to claim 1, wherein
the suspension has a damper that is fixed to the suspension housing in a posture in which the damper is inclined such that an upper side of the damper is located farther on a rear side than a lower side of the damper; and
a length in the front-rear direction of the second fixing portion is longer than a length in the front-rear direction of the first fixing portion.

4. The front vehicle body structure of a vehicle according to claim 2, wherein
the suspension has a damper that is fixed to the suspension housing in a posture in which the damper is inclined such that an upper side of the damper is located farther on a rear side than a lower side of the damper; and
a length in the front-rear direction of the second fixing portion is longer than a length in the front-rear direction of the first fixing portion.

5. The front vehicle body structure of a vehicle according to claim 1, wherein
the front frame extends frontward from a dashboard panel; and
a coupling panel that couples together a rear end portion of the suspension housing and the dashboard panel is provided.

6. The front vehicle body structure of a vehicle according to claim 2, wherein
the front frame extends frontward from a dashboard panel; and
a coupling panel that couples together a rear end portion of the suspension housing and the dashboard panel is provided.

7. The front vehicle body structure of a vehicle according to claim 3, wherein
the front frame extends frontward from a dashboard panel; and
a coupling panel that couples together a rear end portion of the suspension housing and the dashboard panel is provided.

8. The front vehicle body structure of a vehicle according to claim 4, wherein
the front frame extends frontward from a dashboard panel; and a coupling panel that couples together a rear end portion of the suspension housing and the dashboard panel is provided.

9. The front vehicle body structure of a vehicle according to claim 1, wherein
the closed cross-sectional part of the front frame has a substantially rectangular parallelepiped shape elongated in the up-down direction, and
the front frame has:
a first side surface part extending in the up-down direction and the front-rear direction and forming an outer side surface in the vehicle width direction of the front frame;
an upper surface part extending inward in the vehicle width direction from an upper edge of the first side surface part and forming an upper surface of the front frame;
a lower surface part extending inward in the vehicle width direction from a lower edge of the first side surface part and forming a lower surface of the front frame;
a second side surface part extending in the up-down direction between an inner edge in the vehicle width direction of the upper surface part and an inner edge in the vehicle width direction of the lower surface part and forming an inner side surface in the vehicle width direction of the front frame; and
an upper flange extending upward from near the inner edge in the vehicle width direction of the upper surface part;
the first fixing portion is provided in the first side surface part; and
the second fixing portion is provided in the upper flange.

10. The front vehicle body structure of a vehicle according to claim 9, wherein the first side surface part of the front frame has a third fixing portion to which a fourth fixed portion is fixed, and the third fixing portion and the fourth fixed portion are joined together.

11. The front vehicle body structure of a vehicle according to claim 10, wherein
the first fixing portion, the second fixing portion, and the third fixing portion are arranged in the order of the first fixing portion, second fixing portion, and third fixing portion, from the front side in the front-rear direction with the first fixing portion being the furthest toward the front and the third fixing portion being furthest toward the rear.

12. The front vehicle body structure of a vehicle according to claim 10, wherein
the upper flange of the front frame is located on the inner side in the vehicle width direction of the first side surface part; and
the second fixing portion is offset inward in the vehicle width direction relative to the first fixing portion and the third fixing portion, and thus the second fixed portion and a third fixed portion are joined to the front frame at a position offset inward in the vehicle width direction relative to the first fixed portion and the fourth fixed portion.

13. A front vehicle body structure of a vehicle, comprising:
a front frame provided at a front part of the vehicle and extending in a vehicle front-rear direction;
a suspension that supports a front wheel, wherein the front frame is a vehicle body rigid member that forms a closed cross-sectional part extending in the front-rear direction; and a suspension housing which is fixed to the front frame and to which the suspension is mounted, wherein the suspension has a first link member that is coupled to the front wheel and a second link member that is located on a rear side of the first link member;

the suspension housing houses a damper and opens at a lower end, and is fixed to an apron reinforcement so as to cover an upper side of the front wheel;

the suspension housing has a first supporting part that supports the first link member and a second supporting part that is provided on a rear side of the first supporting part and supports the second link member;

the front frame has a first fixing portion to which the first supporting part is fixed and a second fixing portion to which the second supporting part is fixed; and the first fixing portion and the second fixing portion are provided at positions different from each other in a vehicle width direction when viewed from a front side of the vehicle, wherein the first supporting part includes a first upright wall extending in an up-down direction and the vehicle width direction, a second upright wall extending substantially parallel to the first upright wall on a rear side of the first upright wall, a first inner wall inclined so as to extend in both an up-down direction and a front rear direction, and a first fixed portion extending downward from the first inner wall, the first link member being housed between the first upright wall and the second upright wall, the second supporting part includes a third upright wall extending substantially parallel to the second upright wall, a fourth upright wall extending substantially parallel to the third upright wall on a rear side of the third upright wall, a second inner wall inclined so as to extend in both an up-down direction and a front rear direction, and a second fixed portion extending downward from the second inner wall, the second link member being housed between the third wall and the fourth upright wall, and one of the first fixed portion and second fixed portion is fixed to the outer part of the front frame, and another one of the first fixed portion and second fixed portion is fixed to the inner part of the front frame, in the vehicle width direction.

* * * * *